(12) United States Patent
Madineni et al.

(10) Patent No.: US 11,720,471 B2
(45) Date of Patent: Aug. 8, 2023

(54) MONITORING STACK MEMORY USAGE TO OPTIMIZE PROGRAMS

(71) Applicant: International Business Machines Corporation, Armonk, NY (US)

(72) Inventors: Narayana Aditya Madineni, QLD (AU); Michael W. Gray, QLD (AU); Matthew Green, Ashmore (AU); Luvita Burgess, Queensland (AU)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 17/397,261

(22) Filed: Aug. 9, 2021

(65) Prior Publication Data

US 2023/0044935 A1 Feb. 9, 2023

(51) Int. Cl.
| | | |
|---|---|---|
| G06F 11/00 | (2006.01) | |
| G06F 11/34 | (2006.01) | |
| G06F 11/30 | (2006.01) | |
| G06F 8/72 | (2018.01) | |
| G06F 11/36 | (2006.01) | |
| G06F 8/41 | (2018.01) | |

(52) U.S. Cl.
CPC ........ *G06F 11/3433* (2013.01); *G06F 8/4434* (2013.01); *G06F 8/72* (2013.01); *G06F 11/3037* (2013.01); *G06F 11/3688* (2013.01); *G06F 11/3692* (2013.01)

(58) Field of Classification Search
CPC .......................... G06F 11/3037; G06F 11/3688
See application file for complete search history.

(56) References Cited

U.S. PATENT DOCUMENTS

| | | | |
|---|---|---|---|
| 5,928,369 A | 7/1999 | Keyser et al. | |
| 9,471,237 B1* | 10/2016 | Dass | G06F 11/3065 |
| 9,519,571 B2 | 12/2016 | Li et al. | |
| 9,678,858 B2 | 6/2017 | Zheng et al. | |
| 10,761,965 B2 | 9/2020 | Radu | |
| 10,971,965 B2* | 4/2021 | Yoshino | F04D 25/068 |
| 11,422,880 B1* | 8/2022 | A | G06F 11/3688 |

(Continued)

OTHER PUBLICATIONS

"Determining the stack usage of applications", AN 316, Spring 2019, V 1.1, http://www.keil.com/appnotes/files/apnt_316.pdf, 2019, 14 pages.

(Continued)

*Primary Examiner* — Amine Riad
(74) *Attorney, Agent, or Firm* — Edell, Shapiro & Finnan, LLC (57) ABSTRACT

A computer system determines stack usage. An intercept function is executed to store a stack marker in a stack, wherein the intercept function is invoked when a program enters or exits each function of a plurality of functions of the program. A plurality of stack markers are identified in the stack and a memory address is determined for each stack marker during execution of the program to obtain a plurality of memory addresses. The plurality of memory addresses are analyzed to identify a particular memory address associated with a greatest stack depth. A stack usage of the program is determined based on the greatest stack depth. Embodiments of the present invention further include a method and program product for determining stack usage in substantially the same manner described above.

20 Claims, 7 Drawing Sheets

(56) References Cited

U.S. PATENT DOCUMENTS

| | | | |
|---|---|---|---|
| 2006/0143537 A1* | 6/2006 | Grey | G06F 11/3688 |
| | | | 714/38.14 |
| 2009/0019428 A1 | 1/2009 | Li et al. | |
| 2013/0275981 A1* | 10/2013 | Dalcher | G06F 21/577 |
| | | | 718/100 |
| 2015/0220328 A1* | 8/2015 | Galdo | G06F 8/70 |
| | | | 717/131 |
| 2016/0259715 A1 | 9/2016 | Zheng et al. | |
| 2017/0322861 A1* | 11/2017 | Chan | G06F 9/5055 |
| 2019/0121719 A1* | 4/2019 | Hamon | G06F 11/0769 |
| 2020/0104238 A1 | 4/2020 | Radu | |
| 2021/0109844 A1* | 4/2021 | Allyn | G06F 11/3037 |
| 2021/0133077 A1* | 5/2021 | Delaire | G06F 9/5016 |
| 2022/0291962 A1* | 9/2022 | Cherches | G06F 12/0246 |

OTHER PUBLICATIONS

Anonymously Disclosed, "Automatic trace generation for failing test based on known test component and java exception stack trace", ip.com, IPCOM000176277D, Nov. 11, 2008, 6 pages.

"How to generate calling graph for c code", Static Analysis, https://stackoverflow.com/questions/5373714/how-togenerate-a-calling-graph-for-c-code, downloaded from the internet on May 21, 2021, 8 pages.

* cited by examiner

MONITORING STACK MEMORY USAGE TO OPTIMIZE PROGRAMS

BACKGROUND

1. Technical Field

Present invention embodiments relate to stack-based memory allocation, and more specifically, to monitoring the amount of stack memory used by programs and optimizing programs accordingly.

2. Discussion of the Related Art

Stack is a specific memory region of a program in which data is managed in a first-in-last-out manner by adding data to the stack when the program enters a function and removing the data when the program exits the function. Stack is often used to store variables of fixed length local to the currently active functions. Stack may also be consumed by caller arguments, local variables, register save areas, return addresses, saved stack pointers, alignment padding, and/or other data, depending on the compiler and calling conventions in use.

The amount of stack that a program requires may not be known a priori, but can be empirically determined using various techniques. In general, programmers seek to allocate an amount of stack that is sufficient for a program's requirements without allocating an excessive amount of stack, thus ensuring that the program can execute properly while avoiding the unnecessary consumption of computing resources.

SUMMARY

According to one embodiment of the present invention, a computer system determines stack usage. An intercept function is executed to store a stack marker in a stack, wherein the intercept function is invoked when a program enters or exits each function of a plurality of functions of the program. A plurality of stack markers are identified in the stack and a memory address is determined for each stack marker during execution of the program to obtain a plurality of memory addresses. The plurality of memory addresses are analyzed to identify a particular memory address associated with a greatest stack depth. A stack usage of the program is determined based on the greatest stack depth. Embodiments of the present invention further include a method and program product for determining stack usage in substantially the same manner described above.

BRIEF DESCRIPTION OF THE DRAWINGS

Generally, like reference numerals in the various figures are utilized to designate like components.

DETAILED DESCRIPTION

Present invention embodiments relate to stack-based memory allocation, and more specifically, to monitoring the amount of stack memory used by programs and optimizing programs accordingly. Stack memory, also referred to as stack, is a region of memory that is utilized by currently-executing functions of a program so that the functions can store data. Data stored in a stack is stored in a last-in-first-out manner, and a stack grows from an origin address in memory as the number of functions executing at a particular time and/or the amount of data stored by each function increases. The span of memory addresses from the stack's origin to the memory address at which the most recently-stored data has been stored represents the current stack usage of a program. If the maximum stack usage is known, then a volume of memory equal to the maximum stack usage can be reserved, thus ensuring that a program has sufficient memory for execution without unnecessarily reserving more memory than is necessary.

However, the maximum stack usage of a program may not be known a priori; rather, determining stack usage may require analysis of the program at runtime. Conventional approaches to determining a program's stack usage require running the program under a monitoring program, linking additional, cumbersome code into the program as part of compilation or post-processing, or checking stack levels at short time intervals. These approaches typically impact or disrupt program performance, and can be very tedious, as a program may include thousands of functions. Thus, the conventional techniques to measure stack usage are not feasible in customer production environments.

In contrast, present invention embodiments can determine both the maximum stack usage of a program and stack usage on a per-function level in a manner that does not require instrumentation or timer-based analysis. Present invention embodiments can determine stack usage without impacting program performance, thereby providing a practical approach that enables stack usage to be determined in production environments or in other use-cases. In particular, present invention embodiments make use of a preexisting function tracing system that is implemented in most programming languages, enabling stack usage data to be automatically captured whenever a program enters and/or exits a function. Furthermore, present invention embodiments can exhaustively collect data corresponding to all use-cases of a program, including variables and data representative of a program's state, thereby improving the debugging process by enabling users to quickly find code that closely matches their own stack traces.

Accordingly, present invention embodiments offer improved techniques for determining stack usage of a program. Once the maximum stack usage is known, a program can be optimized such that the program uses only an amount of stack that is necessary for execution, while also avoiding potential stack overflow errors or stack exhaustion bugs. Additionally, present invention embodiments can collect data relating to a program's execution that is normally not obtainable, including execution paths that account for variables or program state, which improves debugging as an exhaustive overview of a program's execution can be obtained. Thus, present invention embodiments provide the practical application of improving the field of computing by reducing the amount of computing resources consumed by programs, by increasing the stability of programs, and by providing improved techniques for debugging.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
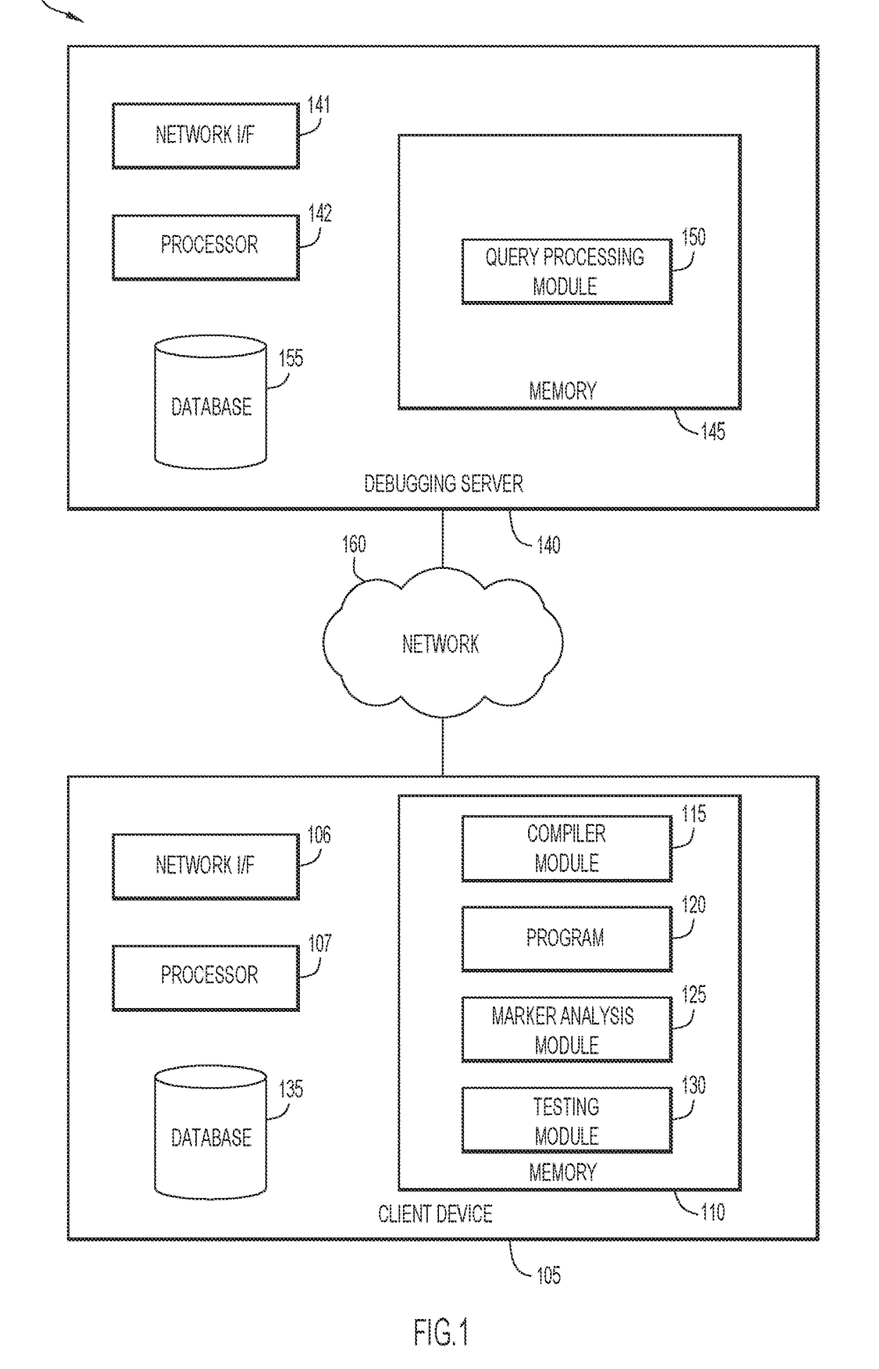
FIG. 1 is a block diagram depicting a computing environment for determining stack usage in accordance with an embodiment of the present invention.

Present invention embodiments will now be described in detail with reference to the Figures. FIG. 1 is a block diagram depicting a computing environment 100 for determining stack usage in accordance with an embodiment of the present invention. As depicted, computing environment 100 includes a client device 105, a debugging server 140, and a network 160. It is to be understood that the functional division among components of computing environment 100 have been chosen for purposes of explaining present invention embodiments and is not to be construed as a limiting example.

Client device 105 includes a network interface (I/F) 106, at least one processor 107, memory 110, and a database 135. Memory 110 may include a compiler module 115, a program 120, a marker analysis module 125, and a testing module 130. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 160. In general, client device 105 enables the development of software applications, determining of stack usage by applications, and optimization of applications. Client device 105 may include internal and external hardware components, as depicted and described in further detail with respect to FIG. 8.

Compiler module 115, program 120, marker analysis module 125, and testing module 130 may include one or more modules or units to perform various functions of present invention embodiments described below. Compiler module 115, program 120, marker analysis module 125, and testing module 130 may be implemented by any combination of any quantity of software and/or hardware modules or units, and may reside within memory 110 of client device 105 for execution by a processor, such as processor 107.

Compiler module 115 may include any conventional or other computer program for translating computer code written in one programming language into another language. Compiler module 115 may translate source code from a high-level programming language to a lower level language (e.g., an assembly language, object code, or machine code) to create an executable program. For example, compiler module 115 may compile source code written in a Java or C#programming language to generate executable applications.

Program module 120 may include a tracing system that is achieved by inserting a tracing function into functions of program 120 to obtain stack traces during execution. Thus, when the program enters or exits each function, the tracing function is invoked, and a stack trace is obtained. A stack trace is a report of the active stack frames at a certain point in time during execution of a program. Each stack frame is considered to be a collection of all information on the stack pertaining to a particular function call, and can include local variables, saved copies of registers modified by functions that could need restoration, argument parameters, and a return address (which allows return statements to return to a correct location). Thus, a stack trace represents a snapshot of a program at a particular point of execution, and since a stack trace indicates the currently-active functions, stack traces may be useful for debugging or other purposes.

The tracing function inserted by the tracing system can be used to call an intercept function during runtime of any program compiled by compiler module 115. In particular, runtime settings for a program, such as program 120, may specify that the tracing function call an intercept function and/or record stack frames for test cases. Additionally, no runtime parameters for a program may be provided, in which case the tracing system may do nothing to affect a program's execution. Thus, when a particular function is called, the tracing function is invoked, which in turn may invoke the intercept function.

The intercept function may insert a stack marker into the stack, which can include a variable whose purpose is to mark a particular location in stack memory. The intercept function may obtain the memory address of the stack marker, and may save that memory address and a corresponding name of the program's current function. Since a stack grows in a particular direction (either in a direction of ascending or descending memory addresses), the memory address of the stack marker can, for a given function, represent the program's stack usage at that time. In addition, the intercept function may store, along with a memory address of a stack marker and the name of a function, the thread identifier and/or process identifier corresponding to the executing function.

Program 120 may include any software application compiled by compiler module 115 in accordance with present invention embodiments. As such, program 120 may include a tracing function that is inserted into each of the functions of program 120, and the tracing function may itself call an intercept function. Program 120 may perform any desired operations that are supported by the source code language. Program 120 is depicted and described in further detail with respect to FIG. 2.

Marker analysis module 125 may analyze the stack marker data obtained via the intercept function inserted into program 120. Marker analysis module 125 may analyze stack marker data received in real-time during execution of program 120, or may analyze stack marker data that is provided after execution of program 120. In some embodiments, marker analysis module 125 determines the peak or maximum stack usage by comparing each stack marker's memory address to a datum address, which corresponds to the origin of a stack. As stacks grow only in one particular direction, the stack marker whose memory address is farthest from the datum address indicates the point at which program 120 consumed the most stack. As each memory address stores a known number of bits, determining the difference between a stack marker's memory address and a datum address correlates to an exact number of bits. The distance from a particular memory address in the stack to the datum address is referred to as the stack depth, and the stack marker that has the greatest stack depth during execution of a program corresponds to the peak or maximum stack usage of the program.

In some embodiments, marker analysis module 125 determines the per-function stack usage by comparing the memory addresses of the stack markers of a first function and a second function called by the first function. In particular, when a function calls another function, the stack is increased by an amount equal, or approximately equal, to the stack memory usage of the called function. Thus, by determining the difference in memory addresses between stack markers that are adjacent in the stack (e.g., a stack marker and its closet neighboring stack marker), stack usage can be determined on a per-function level.

Testing module 130 may include a regression test suite that can perform both functional and non-functional tests on a program to test the program's performance. In some embodiments, testing module 130 performs tests to ensure that software still performs as expected after a change in the software. In particular, testing module 130 may perform tests when an internal bug or customer issue is fixed, or when a new feature is added to a program, to test the changes to the program. Testing module 130 may run through all code paths of a program, such as program 120, to ensure that maximum code coverage is achieved and data is collected for all of the functions of the program.

In some embodiments, when a program, such as program 120, is tested by testing module 130, entry and/or exit into a function invokes the intercept function and causes a stack trace to be obtained at that moment in time. In some embodiments, the stack trace and a corresponding test case number (e.g., for the test case associated with that code path) is stored in a database, such as database 135. In some embodiments, the stack trace and test case number are stored to a test log generated by testing module 130, and the resulting test log is processed to obtain and store stack traces and corresponding test case numbers. Testing module 130 may generate a test data set for a program that includes stack traces, stack trace identifiers (i.e. unique identifiers for each unique stack trace), and a list of test case numbers for test cases that can reproduce each stack trace. The test data sets generated by testing module 130 may be uploaded to a server, such as debugging server 140, so that other developers and users can perform debugging tasks such as issue reproduction.

In some embodiments, a test data set is stored by generating a tree structure wherein each node represents a function: a root node corresponds to a main function, and child nodes correspond to functions that are called by the main function. thus, level n nodes represent stack traces having a depth of n functions. At each node, a list of test cases that invoke the current function represented by the node may be stored. In some embodiments, the list can be a compressed list of test cases that cover the particular function, and a bit vector or other suitable compressed storage method can be used to represent the list.

Database 135 may include any non-volatile storage media known in the art. For example, database 135 can be implemented with a tape library, optical library, one or more independent hard disk drives, or multiple hard disk drives in a redundant array of independent disks (RAID). Similarly, data in database 135 may conform to any suitable storage architecture known in the art, such as a file, a relational database, an object-oriented database, and/or one or more tables. In some embodiments, database 135 may store data including source code, compiled program data, program peak stack usage and per-function stack usage data, test data sets, stack trace data, and the like.

Debugging server 140 includes a network interface (I/F) 141, at least one processor 142, memory 145, and a database 155. Memory 145 may include a query processing module 150. Debugging server 140 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 141 enables components of debugging server 140 to send and receive data over a network, such as network 160. In general, debugging server 140 stores test data sets for programs so that developers and users can perform debugging tasks such as issue reproduction. Debugging server 140 may include internal and external hardware components, as depicted and described in further detail with respect to FIG. 8.

Query processing module 150 may include one or more modules or units to perform various functions of present invention embodiments described below. Query processing module 150 may be implemented by any combination of any quantity of software and/or hardware modules or units, and may reside within memory 145 of debugging server 140 for execution by a processor, such as processor 142.

Query processing module 150 may receive and process queries from remote computing devices, such as client device 105 and/or other computing devices. In particular, the query may include an error report obtained from a program that can be used by technicians to attempt to duplicate an error in order to identify a root cause and formulate a fix for the error. As such, the query may include a stack trace corresponding to an error encountered by a program. Query processing module 150 may analyze the received stack trace to identify same or similar stack traces stored in database 155, which may be populated with stack traces and other test data produced by testing module 130 (e.g., stack trace identifiers (i.e., unique identifiers for each unique stack trace), and a list of test case numbers for test cases that can reproduce each stack trace). Query processing module 150 responds to a query by providing data that includes the test case numbers and/or test cases that reproduced the identified stack trace, which can be useful in reproducing the error whose corresponding stack trace was included in the query.

Query processing module 150 may identify stack traces that are the same or similar to a stack trace provided in a query by comparing the stack frames of the queried stack trace to the stack frames of each stack trace in database 155 to find a closest match. In some embodiments, the closest match is determined based on the maximum number of stack frames that match between the queried stack trace and a stack trace in database 155. Thus, query processing module 150 may iteratively compare stack frames of the queried stack trace to each of the stack traces in database 155 for a given program until a closest or exact match can be identified.

In some embodiments, query processing module 150 utilizes the tree structures generated by testing module 130 in order to perform query processing. In particular, conventional or other largest subtree identification techniques can be employed to identify a particular subtree, and therefore associated test cases, that is a closest match to a query's back trace.

Database 155 may include any non-volatile storage media known in the art. For example, database 155 can be implemented with a tape library, optical library, one or more independent hard disk drives, or multiple hard disk drives in a redundant array of independent disks (RAID). Similarly, data in database 155 may conform to any suitable storage architecture known in the art, such as a file, a relational database, an object-oriented database, and/or one or more tables. In some embodiments, database 155 may store data relating to test data sets for programs, including stack trace data, stack trace identifiers (i.e. unique identifiers for each unique stack trace), a list of test case numbers for test cases that can reproduce each stack trace, stack trace trees, and the like.

Network 160 may include a local area network (LAN), a wide area network (WAN) such as the Internet, or a combination of the two, and includes wired, wireless, or fiber optic connections. In general, network 160 can be any combination of connections and protocols known in the art that will support communications between client device 105, debugging server 140, and/or other computing devices via their respective network interfaces in accordance with embodiments of the present invention.

Figure 2:
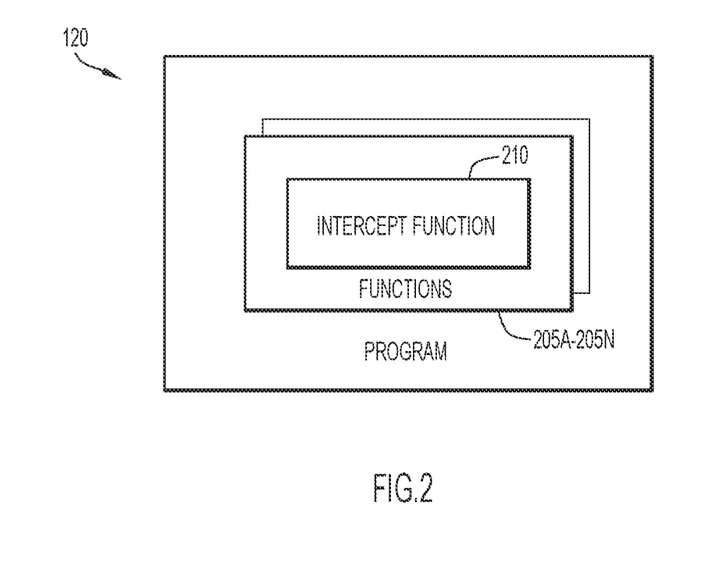
FIG. 2 is a block diagram depicting a program at runtime in accordance with an embodiment of the present invention.

FIG. 2 is a block diagram depicting a program 120 at runtime in accordance with an embodiment of the present invention. As depicted, program 120 includes a plurality of functions 205A-205N and an intercept function 210 inserted into each function. Each function 205A-205N may call one or more other functions in order to achieve a particular programming goal during execution of program 120. Intercept function 210 may be invoked whenever any of functions 205A-205N are called. When intercept function 210 is invoked, intercept function 210 may store a stack marker in stack, obtain the memory address of the stack marker, and store the memory address along with the name of the current function, the thread identifier, and the process identifier. The data stored by intercept function 210 at each invocation (e.g., the memory address, function name, thread identifier, and/or process identifier) may be stored at a location outside of stack, such as non-volatile memory (e.g., database 135).

Figure 3:
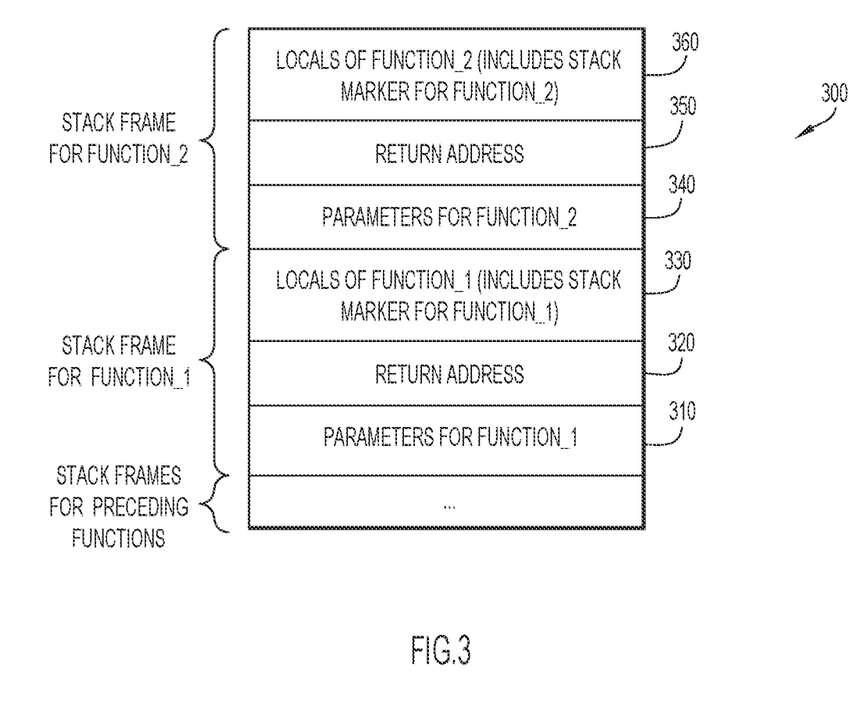
FIG. 3 is a block diagram depicting a stack in accordance with an embodiment of the present invention.

FIG. 3 is a block diagram depicting a stack 300 in accordance with an embodiment of the present invention. As depicted, stack 300 grows upwardly, and as each new function is called, it stores data at the top of stack 300. Stack 300 includes a plurality of stack frames, including stack frames for one or more preceding functions, a stack frame for a function named "FUNCTION_1," and a stack frame for function named "FUNCTION_2." Each stack frame corresponds to the data that a given function stores in the stack.

Each stack frame may include parameters, which are argument values that are passed on to the function. In the depicted example, FUNCTION_1 stores parameters 310 and FUNCTION_2 stores parameters 340. On top of the parameters, a function stores the return address that points back to the function's caller. In the depicted example, since the stack frame for FUNCTION_2 is above the stack frame for FUNCTION_1, then FUNCTION_1 is the caller function that invoked FUNCTION 2, and so, return address 350 points back to the address for FUNCTION_1. In turn, return address 320 points back to the caller function of FUNCTION_1.

The locals for a function corresponds to the storage space for local variables, if any. The stack marker stored by the intercept function for each function is stored in the locals. In the depicted example, the stack marker of FUNCTION_2 is stored in locals 360, and the stack marker of FUNCTION_1 is stored in locals 330. Since the local variables of a function are stored at the top of the function's stack frame, the distance from one stack marker to another corresponds to the span, and therefore stack usage, of the function. In particular, the stack usage of FUNCTION_2 can be obtained by determining the distance in memory from the stack marker for FUNCTION_2 to the stack marker for FUNCTION_1.

Figure 4:
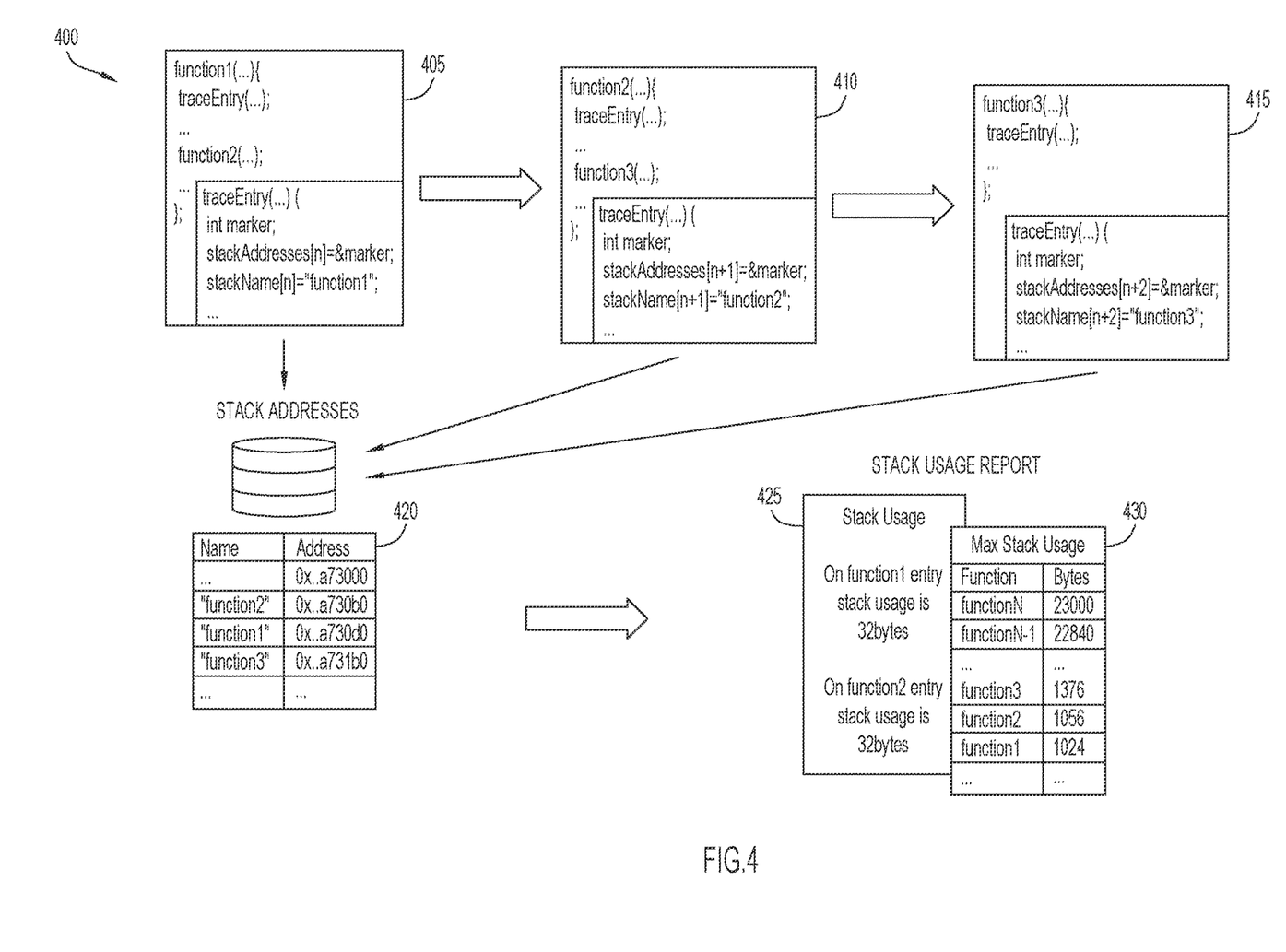
FIG. 4 is a block diagram depicting the collection of stack usage data in accordance with an embodiment of the present invention.

FIG. 4 is a block diagram 400 depicting the collection of stack usage data in accordance with an embodiment of the present invention. As depicted, a first function 405 named "function1" calls a second function 410, named "function2," which in turn calls a third function 415 named "function3." The example code for each function includes a traceEntry function that corresponds to the intercept function; thus, the intercept function is invoked by each of functions 405, 410, and 415. As is also shown in the example code, the intercept function creates a variable (here an integer named "marker"), obtains the memory address of the variable, and obtains the name of the current function. A table 420 of functions and the corresponding memory addresses of their stack markers can be assembled, which can be analyzed to identify stack usage. In particular, the stack usage at each entry of a function can be determined based on the memory address of the function's stack marker. The stack usage at entry of each function can be provided as a usage summary 425, which can be sorted to produce a table 430 that indicates a maximum stack usage achieved during execution of the program.

Figure 5:
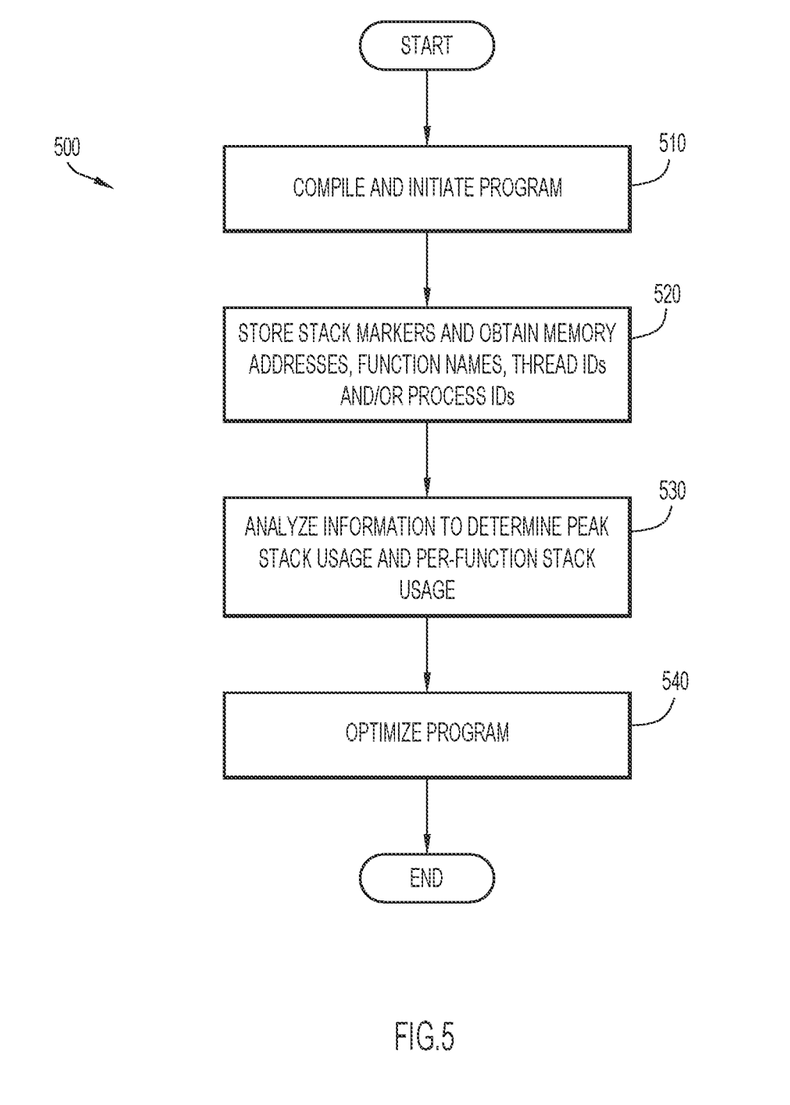
FIG. 5 is a flow chart depicting a method of determining stack usage in accordance with an embodiment of the present invention.

FIG. 5 is a flow chart depicting a method 500 of determining stack usage in accordance with an embodiment of the present invention.

A program is compiled and execution of the compiled program is initiated at operation 510. The program may be compiled using a compiler that natively supports a stack tracing system. At runtime, a program's settings may specify that the stack tracing system calls an intercept function to enable monitoring of stack usage and/or the settings may specify that the stack tracing system records stack traces for test cases (as depicted and described in further detail with respect to FIG. 6). Thus, as the executing program enters and/or exits each function, a tracing function can be invoked to optionally obtain a stack trace, and/or the tracing function may invoke the intercept function.

At operation 520, stack markers are stored as the program enters and/or exits each function, and memory addresses of the stack markers are obtained along with the name of each function, a thread identifier, and/or a process identifier. The memory address for each stack marker may be obtained as a subsequent operation to creating the stack marker, as each particular stack marker may not reside in memory for very long since the function may exit and a pop operation may cause the stack marker to no longer be retrievable. The intercept function may include code to write the stack marker's memory address, along with the name of the function and thread identifier and process identifier for the function to a particular location, such as a non-volatile storage location or other location outside of the stack.

The obtained information is analyzed to determine the peak stack usage and a per-function stack usage at operation 530. For each function called by another function, the stack usage of the called function can be determined by comparing the called function's stack marker memory address to the stack marker memory address of the caller function. Thus, by determining the difference in memory addresses, the stack usage of individual functions can be determined. Additionally or alternatively, the memory addresses can be compared to a datum memory address representing the bottom of the stack to determine a current stack usage at the time that a given function is invoked, as well as the maximum stack usage of the program. In some embodiments, a vector stores a value of a current stack usage, and in response to the intercept function obtaining a memory address that is farther from the datum address than the currently-stored value, the vector writes over the value with the new value. Thus, the vector may always store a value associated with a highest-yet-encountered stack usage, and when the program finishes execution, the value stored by the vector should correspond to the maximum stack usage of the program.

In some embodiments, the obtained information may be processed to remove outliers or bad data. Additionally or alternatively, a program may be executed a number of times in order to identify outliers or bad data, which is then removed. The per-function stack usage may be sorted by usage and presented such that the functions are ranked in a particular order of usage, such as greatest to least or least to greatest. The maximum stack usage may also be presented with an indication of the function associated with the maximum stack usage and/or a stack trace at the time that the maximum stack usage occurred. Stack sizes can be recommended per-thread or per-process based on the stack usage data.

The program is optimized at operation 540. In some embodiments, the program may be optimized by recompiling the program such that the program does not allocate any more memory to the stack than the amount utilized during maximum stack usage. In some embodiments, code refactoring operations may be performed to modify the order in which functions are called so that one or more of the functions active at peak stack usage are instead called at another point in execution, thereby reducing the peak stack usage. These code optimizations may be performed in combination with each other and/or other conventional or novel optimization techniques, and may be performed automatically to generate an optimized program.

Figure 6:
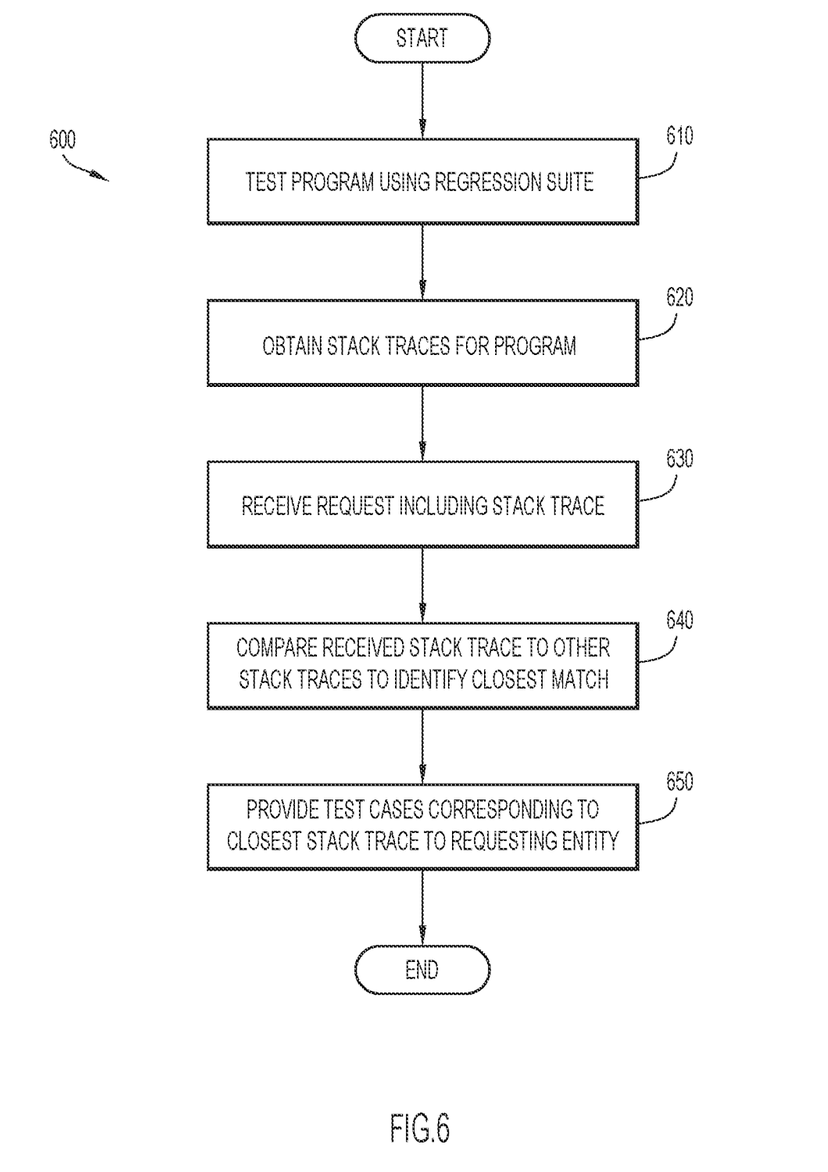
FIG. 6 is a flow chart depicting a method of collecting stack traces in accordance with an embodiment of the present invention.

FIG. 6 is a flow chart depicting a method 600 of collecting stack traces in accordance with an embodiment of the present invention.

A program is tested using a regression suite at operation 610. The regression suite may test a program by performing a number of tests that cause the program to execute every possible code path, including both functional and non-functional tests to check the program's integrity.

Stack traces for the program are obtained at operation 620. The stack traces may be obtained at entry and/or exit of each function during the testing, and may include data corresponding to the current stack frames at each particular time. Additionally, the data may include variables and/or program state at each time the tracing function is invoked (i.e. function entry/exit).

A request is received that includes a stack trace associated with an error at operation 630. The stack trace may be generated by a program, executing on the requesting entity's computing device or another computing device, as a result of the program encountering an error.

The received stack trace is compared to other stack traces for the program to identify a closest match at operation 640. A database may store stack traces for a program that include the functions active at each branch of execution as well as one or more test cases (i.e., the particular tests performed by a regression test suite) used to obtain each stack trace. In some embodiments, a stack trace tree is constructed with root nodes corresponding to caller functions and child nodes corresponding to called functions; each node can include one or more test cases associated with the function of that node. Thus, the received stack trace can be used to perform a largest common subtree search, and the one or more test cases associated with the node at the bottommost level can be obtained.

Test cases corresponding to the closest-matching stack trace are provided back to the requesting entity at operation 650. The test cases correspond to the program's state, as determined by the regression test suite, that is closest to the state associated with the error encountered by the requesting entity. Thus, the test cases can be used to replicate the problem so that debugging can be performed.

Figure 7:
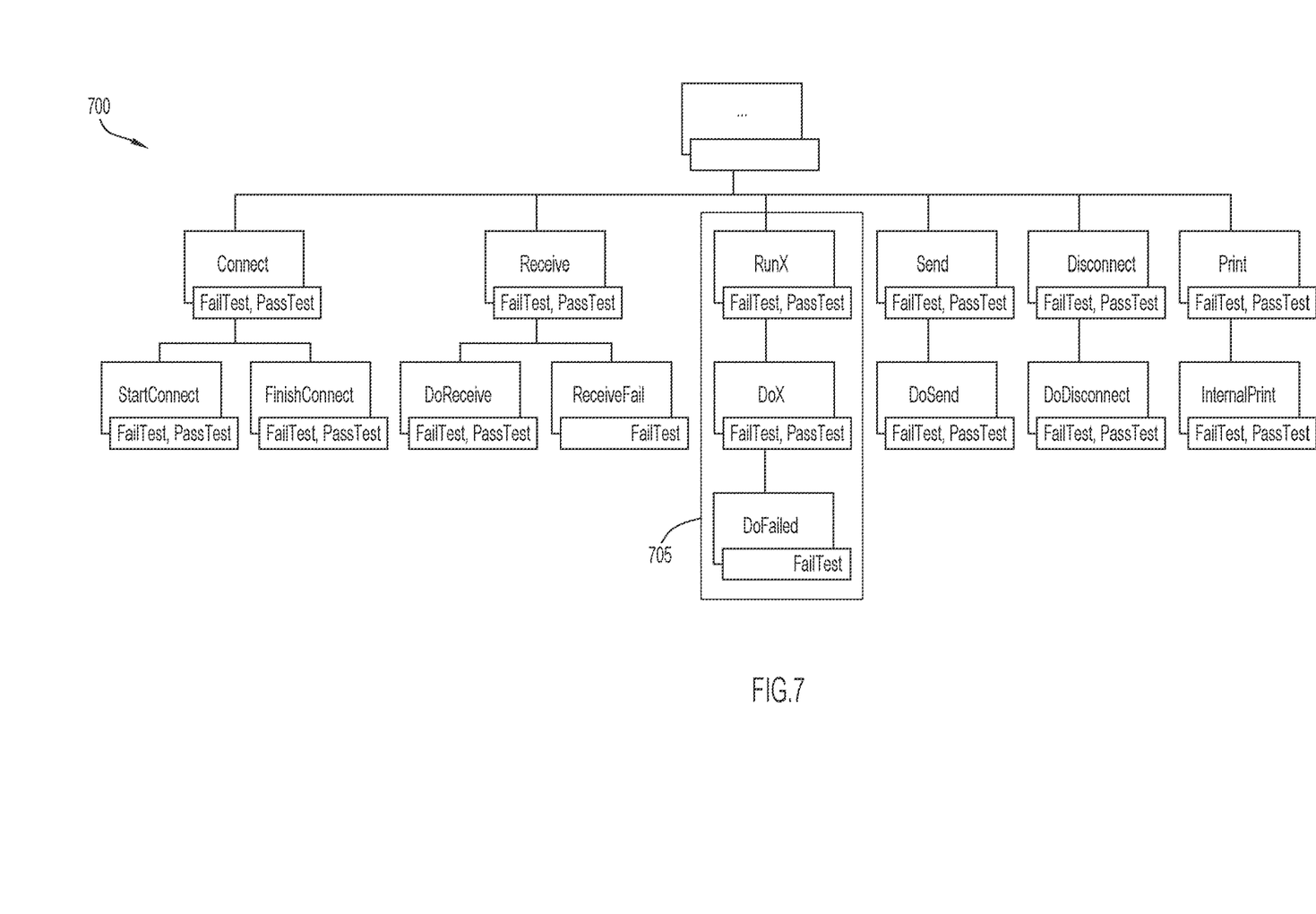
FIG. 7 is a block diagram depicting a stack trace tree in accordance with an embodiment of the present invention.

FIG. 7 is a block diagram depicting a stack trace tree 700 in accordance with an embodiment of the present invention. As depicted, stack trace tree 700 includes a plurality of nodes, each corresponding to one function of a program. As the program is tested a number of times using a regression testing suite, stack traces for each function can be obtained; the stack traces may be associated with passed or failed tests. Additionally, each node stores one or more test cases associated with the stack traces, so that the states corresponding to each stack trace can be replicated. In some embodiments, the stack trace tree 700 can be used to quickly identify functions in particular that require additional testing.

When a request including a stack trace is received, the request can be compared to each subtree of stack trace tree 700 in order to identify a closest match. For example, if the request includes a stack trace of DoFailed, DoX, and RunX, then subtree 705 will be selected based on a largest subtree identification technique, and the test cases associated with the DoFailed node will be provided to the requesting entity.

Figure 8:
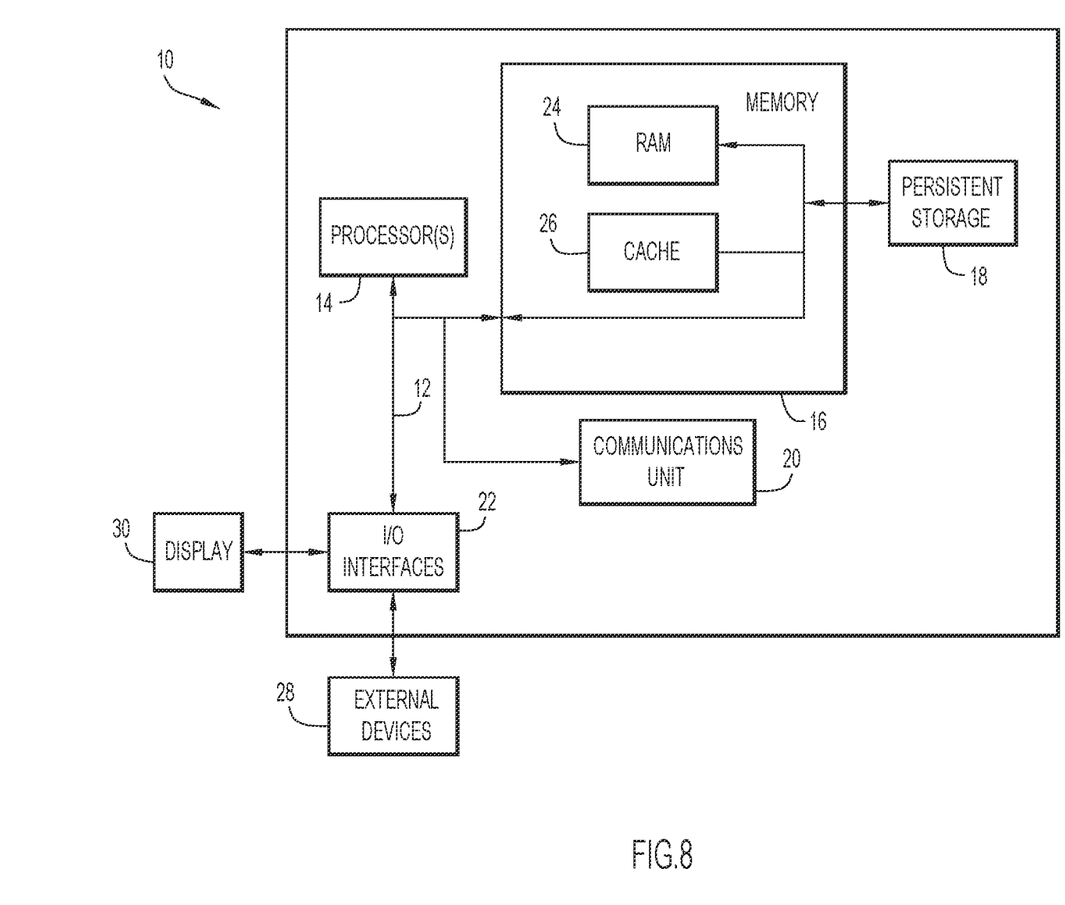
FIG. 8 is a block diagram depicting a computing device in accordance with an embodiment of the present invention.

FIG. 8 is a block diagram depicting components of a computer 10 suitable for executing the methods disclosed herein. Computer 10 may implement client device 105 and/or debugging server 140 in accordance with embodiments of the present invention. It should be appreciated that FIG. 8 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to determining stack memory usage to optimize programs (e.g., program data, memory address data, stack usage data, stack trace data, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105 and/or debugging server 140 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to determining stack memory usage to optimize programs (e.g., program data, memory address data, stack usage data, stack trace data, etc.) may include any information provided to, or generated by, client device 105 and/or debugging server 140. Data relating to determining stack memory usage to optimize programs may include any desired format and arrangement, and may include any quantity of any types of fields of any size to store any desired data. The data relating to determining stack memory usage to optimize programs may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to determining stack memory usage to optimize programs), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of monitoring stack memory usage of programs.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, compiler module 115, program 120, marker analysis module 125, testing module 130, query processing module 150, etc.). These systems may include any types of monitors and input devices (e.g., keyboard, mouse, voice recognition, etc.) to enter and/or view information.

It is to be understood that the software (e.g., communications software, server software, compiler module 115, program 120, marker analysis module 125, testing module 130, query processing module 150, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, compiler module 115, program 120, marker analysis module 125, testing module 130, query processing module 150, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to determining stack usage to optimize programs). The database system may be implemented by any number of any conventional or other databases, data stores or storage structures (e.g., files, databases, data structures, data or other repositories, etc.) to store information (e.g., data relating to determining stack usage to optimize programs). The database system may be included within or coupled to the server and/or client systems. The database systems and/or storage structures may be remote from or local to the computer or other processing systems, and may store any desired data (e.g., data relating to determining stack usage to optimize programs).

The present invention embodiments may employ any number of any type of user interface (e.g., Graphical User Interface (GUI), command-line, prompt, etc.) for obtaining or providing information (e.g., data relating to determining stack usage to optimize programs), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, analyzing stack usage of programs during execution and optimizing programs accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for monitoring stack usage, the method comprising:
   executing an intercept function to store a stack marker in a stack, wherein the intercept function is invoked when a program enters or exits each function of a plurality of functions of the program;
   identifying a plurality of stack markers in the stack and determining a memory address for each stack marker during execution of the program to obtain a plurality of memory addresses;
   analyzing the plurality of memory addresses to identify a particular memory address associated with a greatest stack depth; and
   determining a stack usage of the program based on the greatest stack depth.

2. The computer-implemented method of claim 1, further comprising:
   comparing a first memory address of a stack marker of a particular function to a second memory address of a second stack marker associated with a caller function of the particular function to determine a per-function stack usage of the particular function.

3. The computer-implemented method of claim 2, further comprising:
   determining the per-function stack usage of each function of the plurality of functions.

4. The computer-implemented method of claim 1, wherein invoking the intercept function causes the intercept function to obtain one or more of: a function name, a thread identifier, and a process identifier.

5. The computer-implemented method of claim 1, further comprising:

generating an optimized program corresponding to the program, wherein the optimized program is allocated stack memory based on the determined stack usage of the program.

6. The computer-implemented method of claim 1, wherein the invoking the intercept function causes a stack trace and a corresponding test case number to be obtained for the program.

7. The computer-implemented method of claim 6, wherein a plurality of stack traces and corresponding test case numbers are obtained for the program, and wherein the plurality of stack traces and corresponding test case numbers are compared to a stack trace associated with an error to identify a test case corresponding to the error.

8. A computer system for monitoring stack usage, the computer system comprising:
   one or more computer processors;
   one or more computer readable storage media;
   program instructions stored on the one or more computer readable storage media for execution by at least one of the one or more computer processors, the program instructions comprising instructions to:
   execute an intercept function to store a stack marker in a stack, wherein the intercept function is invoked when a program enters or exits each function of a plurality of functions of the program;
   identify a plurality of stack markers in the stack and determining a memory address for each stack marker during execution of the program to obtain a plurality of memory addresses;
   analyze the plurality of memory addresses to identify a particular memory address associated with a greatest stack depth; and
   determine a stack usage of the program based on the greatest stack depth.

9. The computer system of claim 8, wherein the program instructions further comprise instructions to:
   compare a first memory address of a stack marker of a particular function to a second memory address of a second stack marker associated with a caller function of the particular function to determine a per-function stack usage of the particular function.

10. The computer system of claim 9, wherein the program instructions further comprise instructions to:
    determine the per-function stack usage of each function of the plurality of functions.

11. The computer system of claim 8, wherein invoking the intercept function causes the intercept function to obtain one or more of: a function name, a thread identifier, and a process identifier.

12. The computer system of claim 8, wherein the program instructions further comprise instructions to:
    generate an optimized program corresponding to the program, wherein the optimized program is allocated stack memory based on the determined stack usage of the program.

13. The computer system of claim 8, wherein the invoking the intercept function causes a stack trace and a corresponding test case number to be obtained for the program.

14. The computer system claim 13, wherein a plurality of stack traces and corresponding test case numbers are obtained for the program, and wherein the plurality of stack traces and corresponding test case numbers are compared to a stack trace associated with an error to identify a test case corresponding to the error.

15. A computer program product for determining stack usage, the computer program product comprising one or more computer readable storage media collectively having program instructions embodied therewith, the program instructions executable by a computer to cause the computer to:
   execute an intercept function to store a stack marker in a stack, wherein the intercept function is invoked when a program enters or exits each function of a plurality of functions of the program;
   identify a plurality of stack markers in the stack and determining a memory address for each stack marker during execution of the program to obtain a plurality of memory addresses;
   analyze the plurality of memory addresses to identify a particular memory address associated with a greatest stack depth; and
   determine a stack usage of the program based on the greatest stack depth.

16. The computer program product of claim 15, wherein the program instructions further cause the computer to:
    compare a first memory address of a stack marker of a particular function to a second memory address of a second stack marker associated with a caller function of the particular function to determine a per-function stack usage of the particular function.

17. The computer program product of claim 16, wherein the program instructions further cause the computer to:
    determine the per-function stack usage of each function of the plurality of functions.

18. The computer program product of claim 15, wherein invoking the intercept function causes the intercept function to obtain one or more of: a function name, a thread identifier, and a process identifier.

19. The computer program product of claim 15, wherein the program instructions further cause the computer to:
    generate an optimized program corresponding to the program, wherein the optimized program is allocated stack memory based on the determined stack usage of the program.

20. The computer program product of claim 15, wherein the invoking the intercept function causes a stack trace and a corresponding test case number to be obtained for the program.

* * * * *